(12) United States Patent
Suenaga

(10) Patent No.: US 10,083,132 B2
(45) Date of Patent: Sep. 25, 2018

(54) MANAGEMENT OF BUILDING AND HOUSEHOLD APPLIANCES USING PORTABLE COMPUTING DEVICE

(71) Applicant: KYOCERA Corporation, Kyoto-shi, Kyoto (JP)

(72) Inventor: Takashi Suenaga, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 231 days.

(21) Appl. No.: 15/033,374

(22) PCT Filed: Oct. 31, 2014

(86) PCT No.: PCT/JP2014/005525
§ 371 (c)(1),
(2) Date: Apr. 29, 2016

(87) PCT Pub. No.: WO2015/064113
PCT Pub. Date: May 7, 2015

(65) Prior Publication Data
US 2016/0245537 A1     Aug. 25, 2016

(30) Foreign Application Priority Data

Oct. 31, 2013   (JP) ................................ 2013-226976

(51) Int. Cl.
*G06F 13/00* (2006.01)
*H04Q 9/00* (2006.01)
(Continued)

(52) U.S. Cl.
CPC .............. *G06F 13/00* (2013.01); *F24F 11/30* (2018.01); *F24F 11/62* (2018.01); *G05B 15/02* (2013.01);
(Continued)

(58) Field of Classification Search
CPC .......... F24F 11/006; F24F 11/62; F24F 11/30; F24F 11/52; F24F 11/61; H04L 12/282;
(Continued)

(56) References Cited

U.S. PATENT DOCUMENTS 8,838,400 B2   9/2014   Inoue et al.
2010/0136975 A1*  6/2010   Onishi .............. H04W 36/0083
                                                    455/436

(Continued)

FOREIGN PATENT DOCUMENTS

JP        S62-276608 A    12/1987
JP        2003-004879 A    1/2003
(Continued)

OTHER PUBLICATIONS

English translation of Japanese Ref. P No. JP2004-135043 (Year: 2004).*

(Continued)

*Primary Examiner* — Ajay Ojha
(74) *Attorney, Agent, or Firm* — Procopio Cory Hargreaves and Savitch LLP

(57) ABSTRACT

For a device that supports a predetermined communication protocol, a function equivalent to a timer function can be executed without using a command prescribed by the predetermined communication protocol. A communication terminal controls, over a network, a device controlled by a signal communicated using the predetermined communication protocol and includes a memory, storing a basic operation application and a timer operation application, and a controller that executes processing based on the basic operation application and the timer operation application. The basic operation application causes a device to execute a basic function with a signal communicated using the predetermined communication protocol, and at a time desig- (Continued)

nated by a timer setting, the timer operation application instructs the basic operation application to cause the device to execute a basic function with a signal communicated using the predetermined communication protocol.

14 Claims, 8 Drawing Sheets

(51) Int. Cl.
    *H04L 29/08*     (2006.01)
    *G05B 15/02*     (2006.01)
    *H04L 12/28*     (2006.01)
    *F24F 11/30*     (2018.01)
    *F24F 11/62*     (2018.01)
    *F24F 11/61*     (2018.01)
    *F24F 11/52*     (2018.01)

(52) U.S. Cl.
    CPC ........ *H04L 12/282* (2013.01); *H04L 12/2816* (2013.01); *H04L 67/32* (2013.01); *H04Q 9/00* (2013.01); *F24F 11/52* (2018.01); *F24F 11/61* (2018.01); *H04L 2012/285* (2013.01)

(58) Field of Classification Search
    CPC ............. H04L 12/2816; H04L 67/32; H04L 2012/285; G05B 15/02
    See application file for complete search history.

(56) References Cited

U.S. PATENT DOCUMENTS

2011/0313693 A1     12/2011   Inoue et al.
2015/0097669 A1*   4/2015   Li ......................... G08B 5/222
                                                          340/539.13

FOREIGN PATENT DOCUMENTS

JP         2004-135043 A     4/2004
JP         2010-128810 A     6/2010
WO       2011-096034 A     11/2011

OTHER PUBLICATIONS

English translation of Japanese Ref. P No. JPS62276608 (A) (Year: 1987).*

English translation of Japanese Ref. P No. JP2003004879 (A) (Year: 2003).*

International Search Report and Written Opinion of the International Searching Authority issued by the Japanese Patent Office for International Application No. PCT/JP2014/005525.

* cited by examiner

FIG. 3

- Air-conditioner settings    [Display settings]
  A list of corresponding air-conditioners is displayed, and the display settings on the remote control and the names can be edited.

- Water heater settings    [Display settings]
  A list of corresponding water heaters is displayed, and the display settings on the remote control and the names can be edited.

- Floor heater settings    [Display settings]
  A list of corresponding floor heaters is displayed, and the display settings on the remote control and the names can be edited.

- Light settings    [Display settings]
  A list of corresponding lights is displayed, and the display settings on the remote control and the names can be edited.

FIG. 4

(a) Air-conditioners (list)

| In operation | Living room 28.5°C (Room temperature 28.5°C) | Dehumidify |
| In operation | Bedroom 28.5°C (Room temperature 28.5°C) | Cool |
| Stopped | Kids' room 1 28.5°C (Room temperature 28.5°C) | Heat |
| Stopped | Kids' room 2 28.5°C (Room temperature 28.5°C) | Automatic |
| Stopped | Kids' room 3 28.5°C (Room temperature 28.5°C) | Fan |

(b) Lights (list)

| Lit | Living room | Color |
| Lit | Front door | Color |
| Off | Kitchen | Off |
| Lit | Kids' room 1 | All night |
| Off | Bedroom | Off |
| All lights on | | All lights off |

Button: Timer
Button: Fan
Button: Temperature
Button: 25°C
Button: Start
Button: 12:00
Button: Stop
Button: 16:00
Button: Confirm (b)

Input error

Button: Timer
Button: Fan
Button: Temperature
Button: 25°C
Button: Start
Button: 12:00
Button: Stop
Button: 16:00
Button: Confirm Characters within dashed line are displayed in red

MANAGEMENT OF BUILDING AND HOUSEHOLD APPLIANCES USING PORTABLE COMPUTING DEVICE

CROSS REFERENCE TO RELATED APPLICATION

This application is a 371 National Stage Application of International Patent Number PCT/JP2014/005525 filed on Oct. 31, 2014 which claims priority to and the benefit of Japanese Patent Application No. 2013-226976 filed on Oct. 31, 2013. The entire contents of each of these applications are incorporated herein by reference.

TECHNICAL FIELD

This disclosure relates to a program for controlling a variety of devices over a network, to a communication terminal that includes the program, and to a control system that includes the communication terminal.

BACKGROUND

In recent years, with the development of information technology, techniques for constructing a home network within a household for centralized management and control of a plurality of devices have been attracting attention. In particular, along with increased awareness of energy issues, techniques such as a Home Energy Management System (HEMS) for installing a power management apparatus in a household to control devices have become known (for example, see JP 2010-128810 A (PTL 1)).

A power management apparatus can construct a home network with devices (such as an air-conditioner or a light) that support for example ECHONET Lite® (ECHONET Lite is a registered trademark in Japan, other countries, or both) and control supporting devices with commands prescribed by ECHONET Lite.

Users, on the other hand, can control the power management apparatus with a communication terminal, such as a smartphone, over a Local Area Network (LAN) or the like. In recent years, communication terminals such as smartphones have rapidly spread, and controlling devices supporting ECHONET Lite with a communication terminal via a power management apparatus greatly enhances user convenience.

CITATION LIST

Patent Literature

PTL 1: JP 2010-128810 A

SUMMARY

Technical Problem

For example in the case of controlling an air-conditioner supporting ECHONET Lite, basic functions such as turning the power ON/OFF, switching modes (cool, heat, dehumidify, and the like), and setting the temperature can be controlled relatively easily with commands prescribed by ECHONET Lite.

In some cases, however, it is difficult to control functions other than the basic functions, such as a timer function, with commands prescribed by ECHONET Lite. The reason is that for functions other than the basic functions, such as a timer function, the operating procedure often differs by model, even for the same manufacturer.

To address this issue, the operating procedure for the timer function could be acquired for all models and stored, but unfortunately, doing so would complicate the design and might fill up the memory area of the CPU.

Solution to Problem

A communication terminal according to one of the disclosed embodiments is for controlling, over a network, a device controlled by a signal communicated using a predetermined communication protocol, the communication terminal including: a display; a communication interface configured to communicate with the device over the network; a memory storing a basic operation application and a timer operation application; and a controller configured to read the basic operation application and the timer operation application from the memory and to execute processing based on the basic operation application and the timer operation application, such that the basic operation application causes the device to execute a basic function using the communication protocol, and at a time designated by a timer setting, the timer operation application instructs the basic operation application to cause the device to execute the basic function with a signal communicated using the communication protocol.

A program according to one of the disclosed embodiments is for causing a communication terminal to control, over a network, a device controlled by a signal communicated using a predetermined communication protocol, the program including: instructing, at a time designated by a timer setting, a basic operation application included on the communication terminal to cause the device to execute a basic function with a signal communicated using the predetermined communication protocol, such that the basic operation application causes the device to execute the basic function using the communication protocol.

A control system according to one of the disclosed embodiments includes: a power management apparatus configured to control a device with a signal communicated using a predetermined communication protocol; and a communication terminal configured to control the device via the power management apparatus, such that the communication terminal includes: a display; a communication interface configured to communicate with the power management apparatus; a memory storing a basic operation application and a timer operation application; and a controller configured to read the basic operation application and the timer operation application from the memory and to execute processing based on the basic operation application and the timer operation application, and based on a timer setting indicated by the timer operation application, the basic operation application causes the device to execute the basic function at a time designated by the timer setting.

Advantageous Effect

According to one of the embodiments of this disclosure, for a device that supports a predetermined communication protocol such as ECHONET Lite, a function equivalent to a timer function can be executed without using a command prescribed by the predetermined communication protocol.

BRIEF DESCRIPTION OF THE DRAWINGS

In the accompanying drawings:

FIG. 3 illustrates an example of a screen displaying a list of devices of different types;

FIGS. 4(a) and 4(b) illustrate an example of a screen displaying a list of a plurality of devices of the same type;

FIGS. 7(a) and 7(b) illustrate an example of the content of an operating procedure display.

DETAILED DESCRIPTION

With reference to the drawings, the following describes embodiments of this disclosure.

Figure 1:
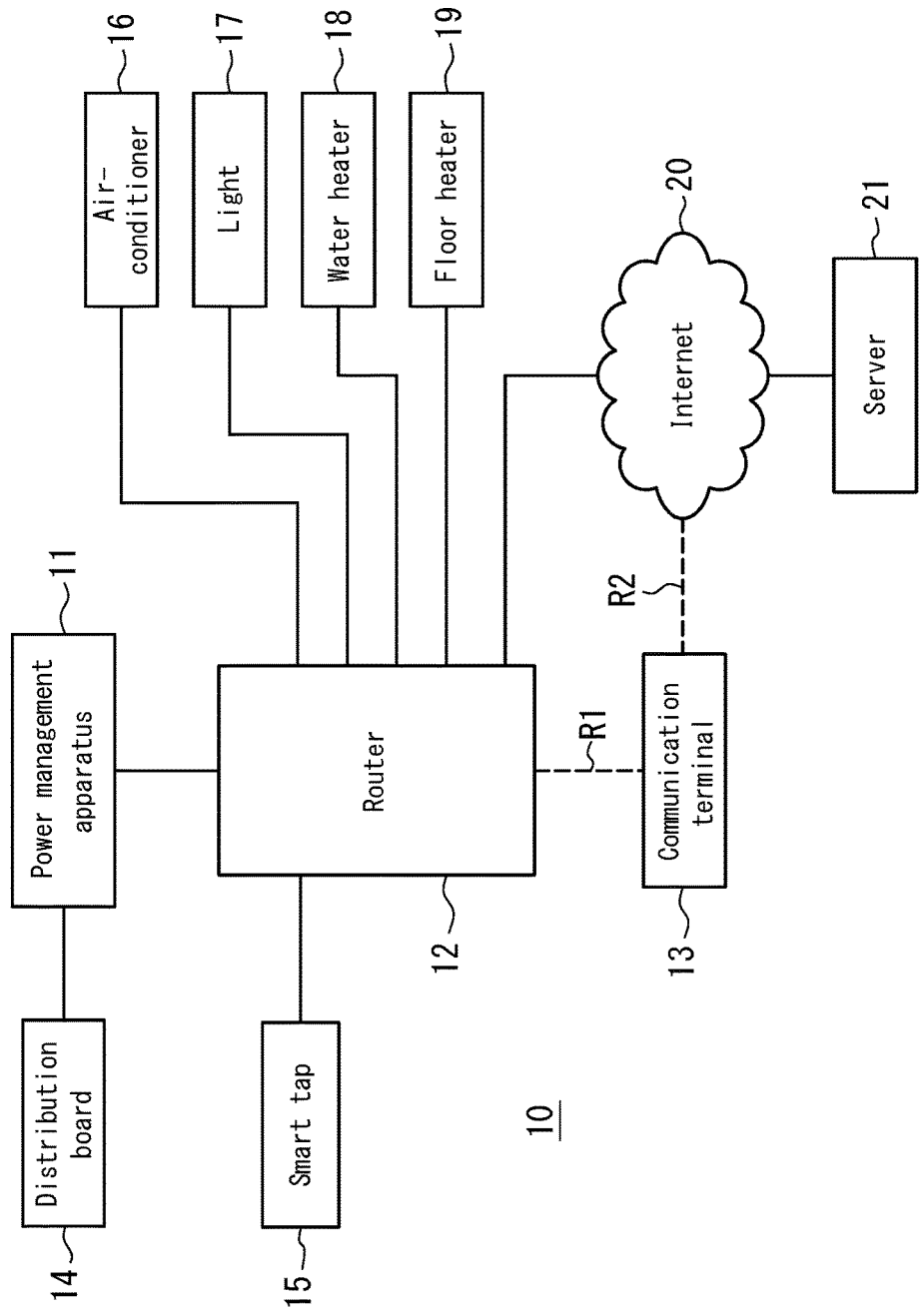
FIG. 1 schematically illustrates the structure of a control system according to one of the embodiments.

FIG. 1 schematically illustrates the structure of a control system 10 according to one of the embodiments. The control system 10 includes a power management apparatus 11, a router 12, a communication terminal 13, a distribution board 14, a smart tap 15, an air-conditioner 16, a light 17, a water heater 18, and a floor heater 19.

The following describes an example of the power management apparatus 11 or the communication terminal 13 controlling devices (smart tap 15, air-conditioner 16, light 17, water heater 18, and floor heater 19) over a network using ECHONET Lite as a predetermined communication protocol. ECHONET Lite is only an example of the communication protocol. This disclosure may be similarly applied in the case of the power management apparatus 11 or communication terminal 13 controlling devices using a different communication protocol.

The power management apparatus 11 can communicate with the communication terminal 13 and the devices (smart tap 15, air-conditioner 16, light 17, water heater 18, and floor heater 19) over a wired or wireless LAN by connecting to the network through the router 12 or the like.

The power management apparatus 11 controls the devices using ECHONET Lite as a predetermined communication protocol. The power management apparatus 11 can also receive the operation state of each device by communication using ECHONET Lite. For example, the power management apparatus 11 can receive information from the air-conditioner 16 such as the operating mode in which the air-conditioner 16 is operating, the currently set temperature, and the like.

The power management apparatus 11 communicates with the communication terminal 13 using a different communication protocol than ECHONET Lite.

The power management apparatus 11 can also connect to the Internet 20 over the router 12. The power management apparatus 11 can download a variety of information from a server 21 connected to the Internet 20. The server 21 is, for example, a software update server, a weather server, or the like. The power management apparatus 11 can, for example, download the latest version of software from the software update server. The power management apparatus 11 can also download weather information and the like from the weather server.

The communication terminal 13 communicates with the power management apparatus 11 via the router 12 using a different communication protocol than ECHONET Lite. The communication terminal 13 connects directly to the router 12 over the path indicated by the dashed line R1 in FIG. 1. The communication terminal 13 may also connect to the Internet 20 over the path indicated by the dashed line R2 in FIG. 1 and then connect to the router 12 via the Internet 20. The path indicated by the dashed line R1 in FIG. 1 is, for example, the communication path when the communication terminal 13 is operated within the home where the router 12 is installed. The path indicated by the dashed line R2 in FIG. 1 is, for example, the communication path when the communication terminal 13 is operated outside. By transmitting instructions to the power management apparatus 11 via the router 12 with a different communication protocol than ECHONET Lite, the communication terminal 13 can control the devices with ECHONET Lite via the power management apparatus 11. The communication terminal 13 can receive information on the devices via the power management apparatus 11. The communication terminal 13 can also directly control the devices with ECHONET Lite via the router 12. The communication terminal 13 may, for example, be a smart phone, a tablet, or a personal computer. Details on the structure and functions of the communication terminal 13 are provided below.

The distribution board 14 distributes power supplied by a commercial power grid into a plurality of branches. Each branch has a current sensor and transmits information on the current consumed by the branch to the power management apparatus 11.

In FIG. 1, the devices controlled by the power management apparatus 11 or the communication terminal 13 using ECHONET Lite are shown as being the smart tap 15, air-conditioner 16, light 17, water heater 18, and floor heater 19. The devices illustrated in FIG. 1, however, are no more than an example. Devices other than those illustrated in FIG. 1 may be included in the control system 10, and the devices illustrated in FIG. 1 need not be included.

While one of each device is illustrated in FIG. 1, a plurality of each device may be included. For example, the air-conditioner 16 may include a plurality of air-conditioners, such as an air-conditioner in the living room, an air-conditioner in the bedroom, and an air-conditioner in the kids' room. The light 17 may also include a plurality of lights, such as a light in the living room, a light by the front door, and a light in the kitchen.

Figure 2:
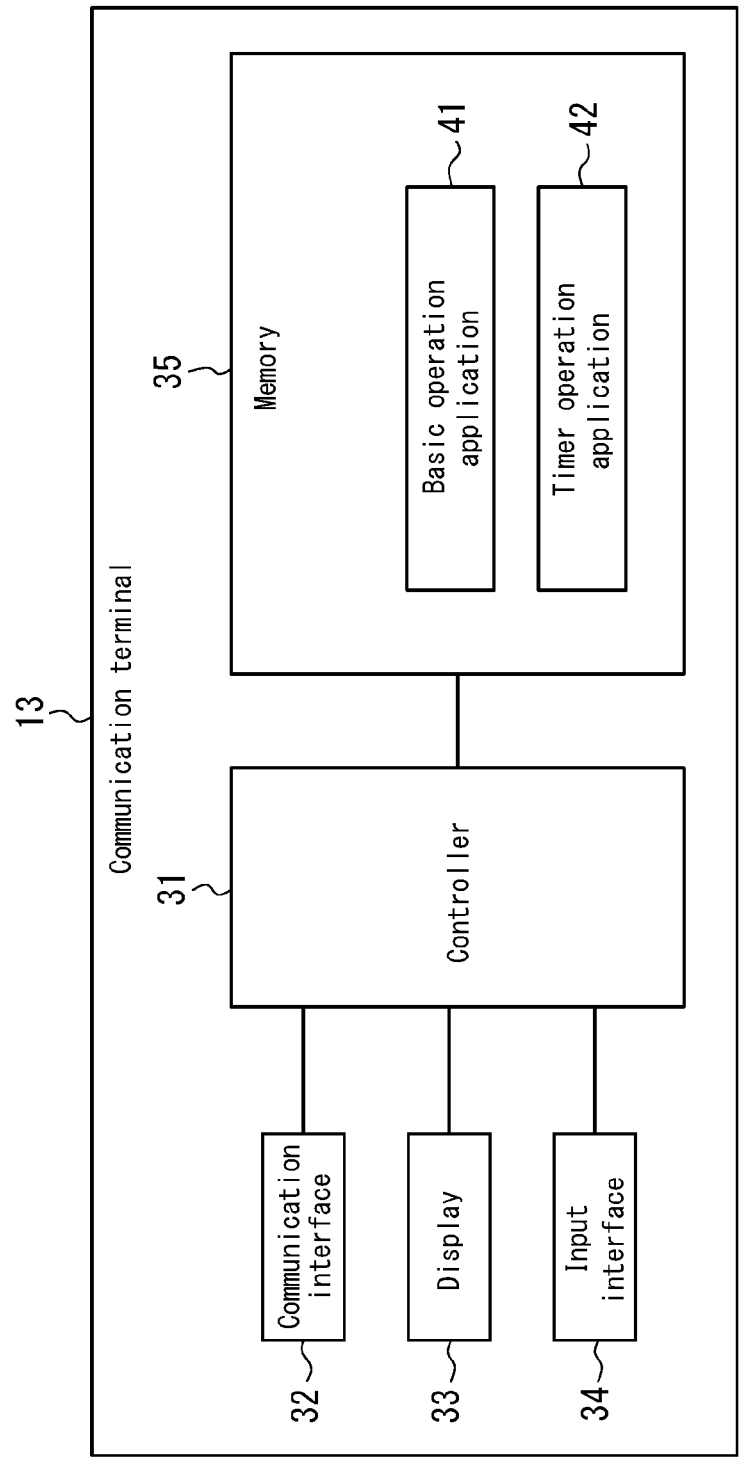
FIG. 2 schematically illustrates the structure of a communication terminal according to one of the embodiments.

Next, the structure and functions of the communication terminal 13 are described in detail. FIG. 2 schematically illustrates the structure of the communication terminal 13 according to one of the embodiments. The communication terminal 13 includes a controller 31, a communication interface 32, a display 33, an input interface 34, and a memory 35.

The controller 31 controls the blocks within the communication terminal 13 and controls the communication terminal 13 overall. The controller 31 reads a basic operation application 41 and a timer operation application 42 from the memory 35 and executes processing based on these applications. The processing executed by the basic operation application 41 and the timer operation application 42 is described below.

The communication interface 32 communicates with the power management apparatus 11 over a network through the router 12 or the like. The communication interface 32 communicates with the devices over a network through the router 12 or the like.

The display 33 for example displays operation screens created by the basic operation application 41 and the timer operation application 42.

The input interface 34 accepts input from the user to the communication terminal 13. In this embodiment, an example of the input interface 34 being a touch sensor is described. In this case, the input interface 34 accepts input to a button displayed on the display 33 when the user touches the button with a finger or the like. The input interface 34 is not, however, limited to being a touch sensor and may be another device for input, such as a keyboard, mouse, or the like.

The memory 35 stores the basic operation application 41 and the timer operation application 42. The memory 35 also stores a variety of other data.

First, the basic operation application 41 is described. The basic operation application 41 is an application for the communication terminal 13 to cause the devices (smart tap 15, air-conditioner 16, light 17, water heater 18, and floor heater 19) to execute basic functions via the power management apparatus 11 using ECHONET Lite or the like. The basic operation application 41 transmits instructions to the power management apparatus 11 with a different communication protocol than ECHONET Lite. In this way, via the power management apparatus 11, the basic operation application 41 can cause the devices to execute basic functions using ECHONET Lite. With the basic operation application 41, the communication terminal 13 may also cause the devices to execute basic functions directly, without going through the power management apparatus 11.

Here, a "basic function" refers to a fundamental function that can be controlled by the same command in ECHONET Lite for a certain type of device, even if the manufacturer or model of the device differs. Basic functions differ by device but at least include turning the power ON/OFF. For example, in the case of the air-conditioner 16, examples of the basic functions include an operation mode setting (automatic, cool, heat, dehumidify, fan, and the like), temperature setting, airflow rate setting, and swing setting (airflow direction setting). In the case of a light, examples of the basic functions include dimming (by levels). For a water heater, examples of the basic functions include filling the bath with hot water and reheating the bath. Examples of the basic functions for a floor heater include adjusting the temperature (setting to a designated temperature).

Examples of functions other than the "basic functions" for the air-conditioner 16 include a timer setting. If the timer setting differs by manufacturer or by model, then this function may require a different operating procedure for control with ECHONET Lite.

Next, the timer operation application 42 is described. At the time designated by the timer setting, the timer operation application 42 instructs the basic operation application 41 to execute the basic functions of the devices.

For example, if a timer setting is made to turn the power to the air-conditioner 16 ON at 18:00 (6 p.m.), then at 18:00, the timer operation application 42 instructs the basic operation application 41 to execute processing to turn the power to the air-conditioner 16 ON. As a result, with the basic operation application 41, a command to turn the power on to the air-conditioner 16 with ECHONET Lite is transmitted from the communication terminal 13 either directly or via the power management apparatus 11.

In the above example, the case of the timer operation application 42 causing the air-conditioner 16 to execute a timer operation has been described, but other devices as well can be caused to execute processing equivalent to the timer operation by an instruction from the timer operation application 42 to the basic operation application 41.

Furthermore, in the above example, the case of turning the power on at the time designated by the timer setting has been described, but this is only an example. With the timer operation application 42, the air-conditioner 16 may be caused to execute a timer operation for other basic functions such as the operation mode setting, temperature setting, or the like, or to execute a plurality of basic functions at the time designated by the timer setting.

Currently, few devices are capable of a timer setting for functions such as the operation mode setting and temperature setting of the air-conditioner 16. This embodiment, however, allows a timer operation to be performed for basic functions other than power ON/OFF, such as operation mode setting and temperature setting. Hence, this embodiment allows devices that do not have a timer function to be caused to execute processing equivalent to a timer operation. In at least one embodiment of this disclosure, the basic operation function executed by the basic operation application 41 and the timer operation function executed by the timer operation application 42 may be executed by a single application.

Next, a specific example of operations is described with reference to FIGS. 3 to 8 as an example of screens displayed by the display 33 of the communication terminal 13.

FIG. 3 illustrates an example of a screen displaying a list of devices of different types. In the example illustrated in FIG. 3, the "Air-conditioner settings", "Water heater settings", "Floor heater settings", and "Light settings" are selectable, and a "Display settings" button is displayed for each section.

FIG. 4(a) illustrates an example of display when the "setting display" button in the section for the air-conditioner setting in FIG. 3 is pressed, and FIG. 4(b) illustrates an example of display when the "setting display" button in the section for the light setting in FIG. 3 is pressed.

As illustrated in FIG. 4(a), upon pressing the "setting display" button in the section for the air-conditioner setting, a list of air-conditioners 16 controlled by the power management apparatus 11 is displayed. In the example in FIG. 4(a), a list of air-conditioners 16 installed in the living room, bedroom, kids' room 1, kids' room 2, and kids' room 3 is displayed. Information on each of the air-conditioners 16 is also displayed. For example, for the air-conditioner 16 in the bedroom, the following information is displayed: currently operating in cool mode, set temperature of 28.5° C., and room temperature of 28.5° C.

As illustrated in FIG. 4(b), upon pressing the "setting display" button in the section for the light setting, a list of lights 17 controlled by the power management apparatus 11 is displayed. In the example in FIG. 4(b), a list of lights 17 installed in the living room, front door, kitchen, kids' room 1, and bedroom is displayed. Information on each of the lights 17 is displayed. For example, for the kids' room 1, information is displayed to indicate that the night light is currently on.

Figure 5:
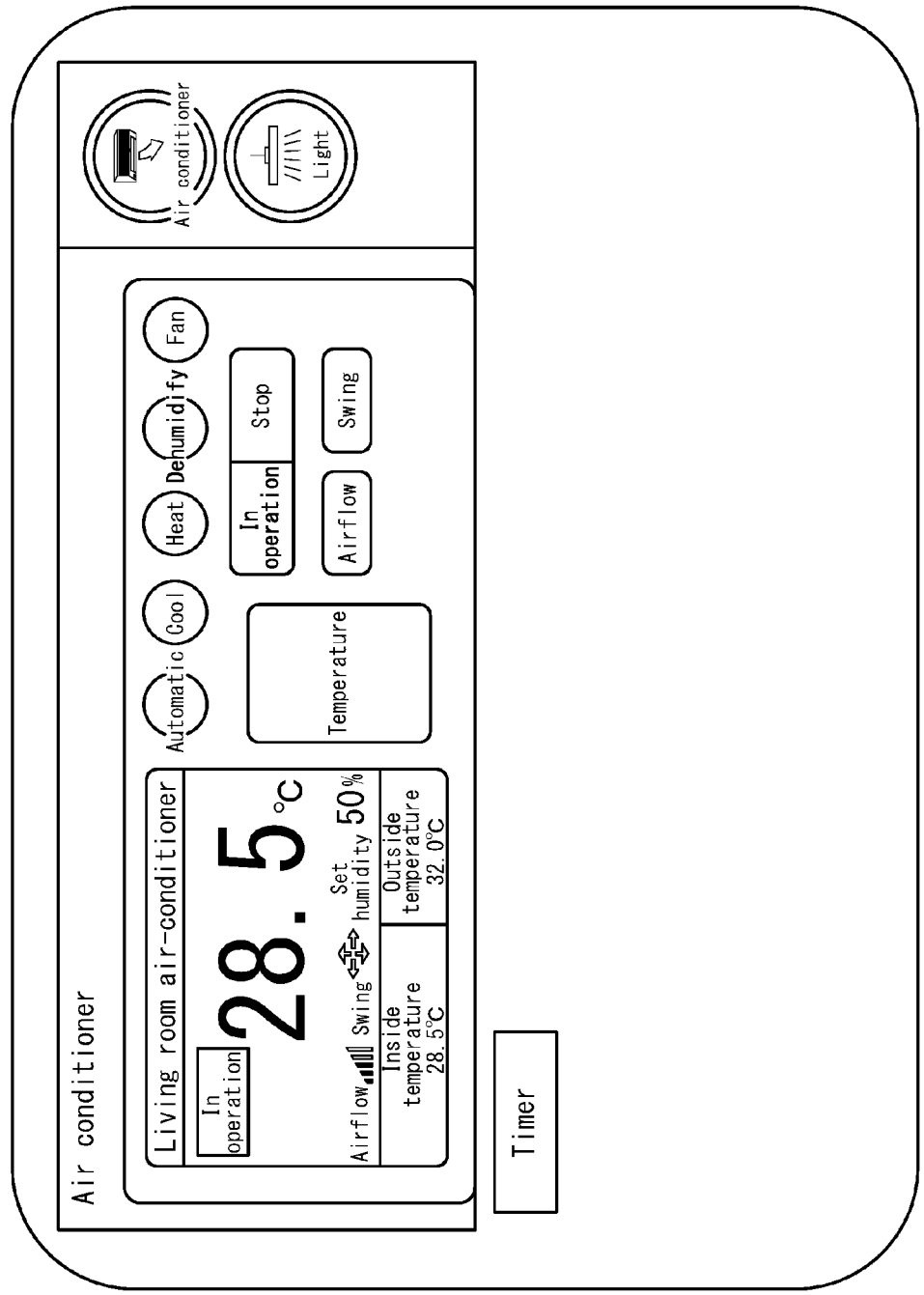
FIG. 5 illustrates an example of an operation screen of a device.

FIG. 5 illustrates an example of buttons for operating the basic functions of the air-conditioner 16 and a button for a timer setting being displayed on the display 33 of the communication terminal 13. In FIG. 5, the buttons displayed for causing the air-conditioner 16 to execute basic functions are operation mode selection buttons (automatic, cool, heat, dehumidify, fan), a temperature button, a start/stop button, an airflow rate button, and a swing button. For example, from among the mode selection buttons, if the user selects the "cool" button, the basic operation application 41 transmits a corresponding instruction to the air-conditioner 16 via the power management apparatus 11 for control to set the mode of the air-conditioner 16 to "cool" using ECHONET Lite. At this time, the basic operation application 41 may transmit an instruction to the air-conditioner 16 via the router 12 without going through the power management apparatus 11. In FIG. 5, the "dehumidify" button is in bold to indicate that the dehumidify mode is currently selected.

The user can turn the power to the air-conditioner 16 ON/OFF with the start/stop button. In FIG. 5, the "start" button is in bold, and "in operation" is displayed, thus indicating that the air-conditioner 16 is currently operating.

For example, when the user selects the "temperature" button, a screen for selecting the temperature (not illustrated) is displayed, and the user can select a desired temperature. Similarly, the user can set the desired airflow rate or swing setting with the "airflow rate" and "swing" buttons.

Figure 6:
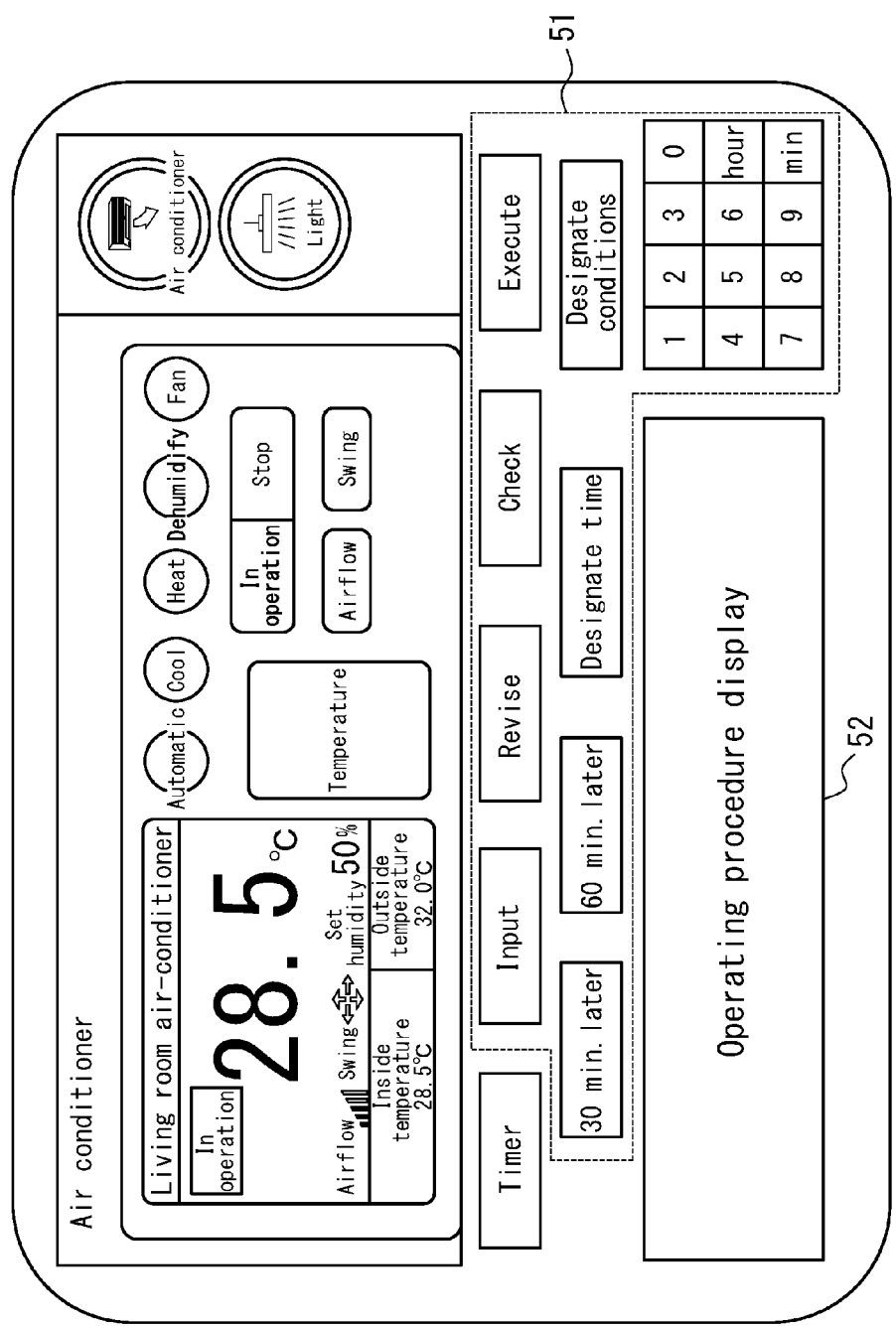
FIG. 6 illustrates an example of the operation screen in FIG. 5 after pressing a timer button.

Upon selecting the "timer" button in FIG. 5, buttons 51 for the timer setting and an operating procedure display 52 that displays the procedures set with the timer setting are displayed, as illustrated in FIG. 6. The display of the buttons 51 for the timer setting and the operating procedure display 52 is not fixed. Rather, the display switches to an appropriate screen display in response to user operation.

Using the buttons 51 for the timer setting and the buttons for operating the basic functions, the user can set a desired timer operation. The operating procedures input by the user are displayed on the operating procedure display 52. FIG. 7(*a*) illustrates an example of display of the operating procedure display 52.

FIG. 7(*a*) displays an example in which the user has input a timer setting for the air-conditioner 16 to start in fan mode with a temperature setting of 25° C. at 12:00 and to stop at 16:00. Upon completion of input, the user presses the "check" button illustrated in FIG. 6 and can determine whether the operating procedures of the timer setting that was input are appropriate. In other words, by pressing the "check" button illustrated in FIG. 6, the user can determine whether the conditions for the timer setting that was input are appropriate. When the "check" button is pressed, the timer operation application 42 determines whether the operating procedures of the timer setting (conditions of the timer setting) are appropriate and can display an error message on the display 33 if the operating procedures are inappropriate.

FIG. 7(*b*) illustrates the example of the "check" button being pressed for the operating procedures in FIG. 7(*a*). In the example of operating procedures illustrated in FIG. 7(*a*), the temperature is set to 25° C., despite the fact that the "fan" mode is selected. These operations are not appropriate, because the fan mode is a mode for simply blowing air, and the temperature cannot be set in this mode. Accordingly, in this case, the timer operation application 42 provides an error indication that the input timer operation is inappropriate, for example by displaying "input error" in the first line of the operating procedure display 52 and displaying the words "button: temperature" and "button: 25° C." in red. When the error indication is displayed on the display 33, the user can press the "revise" button illustrated in FIG. 6 and fix the location of the error to make the timer setting appropriate.

In accordance with the input timer setting, the timer operation application 42 causes the basic operation application 41 to execute basic functions. In the example illustrated in FIGS. 7(*a*) and 7(*b*), at 12:00, the timer operation application 42 causes the basic operation application 41 to execute a command to set the air-conditioner 16 to fan mode and a command to turn on the air-conditioner 16. At 16:00, the timer operation application 42 causes the basic operation application 41 to execute a command to stop the air-conditioner 16.

When executing complicated operating procedures with the timer setting, it is a troublesome burden for the user to input similar operations every time. In order to decrease the burden on the user, the timer operation application 42 may be configured to register and store operating procedures that have been input once. The timer operation application 42 may also be configured to allow operating procedures that the user has executed once to be retrieved from a history and executed again.

Figure 8:
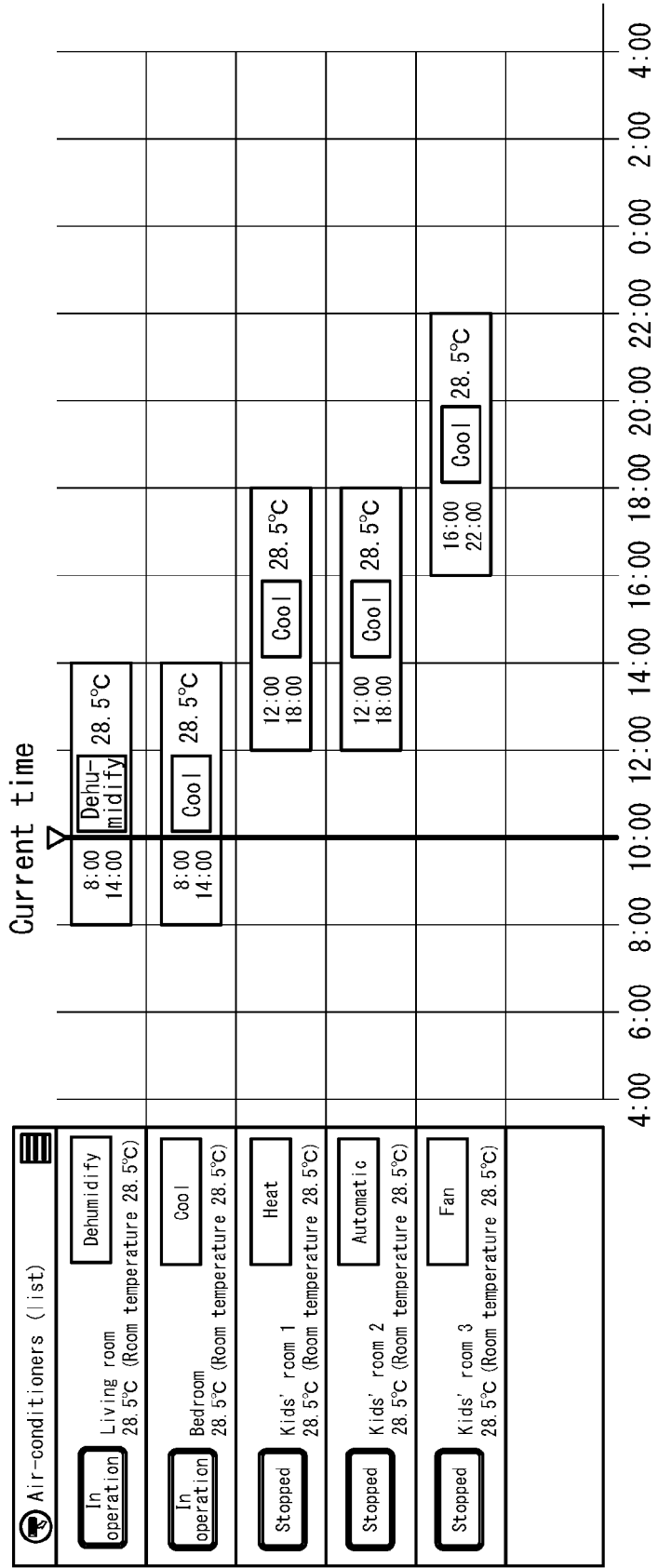
FIG. 8 illustrates an example of a screen displaying a list of timer settings.

FIG. 8 illustrates an example of a screen displaying a list of timer settings set for the air-conditioner 16. In the example in FIG. 8, a list of timer settings for air-conditioners 16 installed in the living room, bedroom, kids' room 1, kids' room 2, and kids' room 3 is displayed.

For example, looking at the section for the air-conditioner 16 installed in the kids' room 1, the timer setting to turn on the air-conditioner 16 at 12:00 in cool mode with a setting temperature of 28.5° C. and to stop at 18:00 is indicated by display of a time schedule depicted in bar form (time bar) and by characters within the time bar.

By selecting a time bar, the user can cause a timer setting screen for the air-conditioner 16 corresponding to the selected time bar to be displayed on the display 33 and can thus easily change the timer setting of the desired air-conditioner 16.

The timer operation application 42 can also propose an energy-saving strategy to the user, such as a power consumption peak shift. For example, in the example illustrated in FIG. 8, a timer setting is set to active the air-conditioner 16 installed in the kids' room 1 and the air-conditioner 16 installed in the kids' room 2 simultaneously at 12:00. Since the power consumption of the air-conditioner 16 is particularly large immediately after activation, it is not preferable from the perspective of energy conservation to turn on two air-conditioners 16 simultaneously. Therefore, in a case such as this one, the timer operation application 42 can display, on the display 33, a timer setting that shifts the activation time of the air-conditioner 16 installed in the kids' room 1 from the activation time of the air-conditioner 16 installed in the kids' room 2 as a recommended energy-saving strategy.

The following describes other, additional functions that may be provided in the communication terminal 13 or the control system 10.

[Timer Operation Retry]

In the case of using wireless communication in a portion of the network, when the timer operation application 42 determines that, at the time designated by the timer setting, the communication terminal 13 is outside the service area or in an area with poor reception and therefore that the communication terminal 13 and the power management apparatus 11 might not be able to communicate, then the timer operation application 42 may wait until the communication state improves. After the communication state improves, the timer operation application 42 may then instruct the basic operation application 41 to execute the basic functions designated by the timer setting. In this case, the timer operation application 42 may display, on the display 33, an indication that a standby state has been entered until the communication state improves. When a command is transmitted after waiting until the communication state improves, the timer operation application 42 may also display the corresponding history on the display 33.

[Control of Devices Based on a Condition]

The timer operation application 42 may not only allow devices to be stopped by the timer function but may also allow devices to be stopped when a predetermined condition is satisfied.

For example, when stopping the air-conditioner 16, temperature information measured by a temperature gauge provided in the air-conditioner 16 may be obtained via the power management apparatus 11 using ECHONET Lite, and when the temperature satisfies a predetermined condition, the air-conditioner 16 may be stopped. For example, when operating in heat mode, the air-conditioner 16 may be stopped when the temperature is a predetermined temperature or higher, and when operating in cool mode, the air-conditioner 16 may be stopped when the temperature is a predetermined temperature or lower.

The timer operation application 42 may also be configured not to turn on a device when a predetermined condition is not satisfied. For example, when controlling the air-conditioner 16, a configuration may be adopted so as not to turn on the air-conditioner 16 if the temperature is within a predetermined temperature. This way, power consumption due to unnecessary activation of the air-conditioner 16 can be reduced.

The temperature information may also be obtained by a different method. For example, temperature information may be obtained via the Internet 20 from the server 21 that provides weather information.

[Optimizing Operation of Devices Based on a Condition]

The timer operation application 42 may have a function to optimize the operation of a device when a predetermined condition is satisfied.

For example, to optimize the operation of the air-conditioner 16, temperature information measured by a temperature gauge provided in the air-conditioner 16 may be obtained via the power management apparatus 11 using ECHONET Lite, and when the temperature satisfies a predetermined condition, an instruction may be transmitted to switch to fan mode when in cool mode or to raise the set temperature by several degrees Celsius after a predetermined length of time elapses. Such control is preferable for example when the user wishes to lessen the cooling effect after going to bed. As an example of similar control, the set temperature for cooling may be left unchanged while switching the fan intensity from "strong" to "weak".

In the case of heat mode, an instruction may be transmitted to lower the set temperature by several degrees Celsius. An instruction may instead be transmitted to switch from heat mode to humidifier mode, and an instruction to lower the temperature may be transmitted as well. To switch to humidifier mode, humidity information measured by a humidity gauge provided in the air-conditioner 16 may be obtained via the power management apparatus 11 using ECHONET Lite, and humidifying may be prioritized if the humidity is a predetermined value or less.

As described above, the timer operation application 42 may treat the setting values for the time until the predetermined condition is satisfied as being set for an indeterminate length of time and may suspend the next timer operation until the predetermined condition is satisfied. When the predetermined condition is satisfied, the timer operation application 42 may then continue to execute the timer operation and complete the timer operation. Note that a plurality of predetermined conditions may be set. In this case, once any one of the predetermined conditions is satisfied, an instruction for the operation that was set for that condition may be transmitted as the instruction for the timer operation. With this sort of control, the operation of devices controlled by timer operation can be optimized in accordance with circumstances.

With the existing timer operation installed in devices such as an air-conditioner, predetermined functions can only be executed and stopped, whereas according to at least one embodiment of this disclosure, an optimal function to be executed by a device can be changed to automatically, resulting in more comfortable operation and yielding operation that conserves energy.

The timer operation application 42 may also be configured to transmit an instruction to the basic operation application to turn the power of another device ON/OFF when determining that it is necessary to operate another device other than a device for which a timer setting has been made. Specifically, for example after a timer operation to turn the air-conditioner 16 ON in heat mode, if humidity information is obtained from the air-conditioner 16 while the timer operation application 42 is running and the humidity has fallen to a predetermined value or less, the timer operation application 42 may be configured to make a determination and issue a command to turn on the power to a humidifier (not illustrated) connected to the smart tap 15 (i.e. the timer operation application 42 turns ON the power to the smart tap). By thus controlling another device (such as a humidifier) using the timer operation application 42 and the basic operation application 41 that are executing a timer operation for the air-conditioner 16, problems that cannot be addressed by the air-conditioner 16 alone, such as dry air, can be addressed by coordinating the air-conditioner 16 with another device to humidify the air.

[Display of Warning During Timer Operation]

If, regarding a device for which a basic function is to be executed via a timer operation, the timer operation application 42 receives information, from the power management apparatus 11, indicating that the basic function for which the timer setting was made is already being executed before the time designated by the timer setting, whereby the basic function to be executed by the timer operation would overlap with a function currently being executed, then the timer operation application 42 may hold off on causing the device to execute the basic function for which the timer setting was made and may display the above information as a warning on the display 33.

As an example of such conditions, when a timer setting is set to turn on the air-conditioner 16 installed in the living room at 18:00 in heat mode with a temperature setting of 28° C., someone might turn on the air-conditioner 16 in the living room before 18:00. The timer operation application 42 can acquire information on the operation status of the air-conditioner 16 via the power management apparatus 11 and determine, from the information, the operation status of the air-conditioner 16 at the time of the timer setting.

[Storage of Timer Operation Application in Power Management Apparatus]

In the control system 10, not only the communication terminal 13, but also the power management apparatus 11 may include a similar application to the timer operation application 42. In this case, based on the timer setting information received from the communication terminal 13 before the time designated by the timer setting, the power management apparatus 11 can cause the devices to execute basic functions at the time designated by the timer setting.

As a result, at the time designated by the timer setting, the power management apparatus 11 can cause the devices to execute desired operations even if the communication terminal 13 is outside the service area or in an area with poor reception.

Furthermore, the power management apparatus 11 may be configured so that when the power management apparatus 11 transmits a notification to the communication terminal 13 before the time designated by the timer setting (for example, approximately 5 to 30 minutes before) to confirm whether to execute the timer operation and then receives an acknowledgment from the communication terminal 13, the power management apparatus 11 causes the device to execute the timer operation.

[Use of Smart Tap to Control Devices not Supporting ECHONET Lite]

Power to the smart tap 15, which supports ECHONET Lite, can be turned ON/OFF with ECHONET Lite. Accordingly, even if a device does not support ECHONET Lite, the power can be turned ON/OFF using ECHONET Lite by connecting the device to the smart tap 15, and the power can be turned ON/OFF with a timer using the timer operation application 42.

In this way, according to this embodiment, the timer operation application 42 issues an instruction to the basic operation application 41 at the time designated by the timer setting for the basic operation application 41 to cause a device supporting a predetermined communication protocol to execute a basic function. Hence, for a device that supports a predetermined communication protocol such as ECHONET Lite, a function equivalent to a timer function can be executed without executing a timer function using a command prescribed by the predetermined communication protocol.

While the present disclosure is based on the drawings and on examples, it should be noted that a person of ordinary skill in the art could easily make a variety of modifications and adjustments based on the present disclosure. Accordingly, these modifications and adjustments should be understood as being included within the scope of the present disclosure. For example, the functions and the like included in the structural components, steps, and the like may be reordered in any logically consistent way. Furthermore, structural components, steps, and the like may be combined into one or divided. While this disclosure focuses on apparatuses, this disclosure may also be implemented as a method, program, or recording medium storing a program that are executed by a processor in an apparatus. This disclosure should be understood as encompassing such implementations.

REFERENCE SIGNS LIST

10 Control system
11 Power management apparatus
12 Router
13 Communication terminal
14 Distribution board
15 Smart tap
16 Air-conditioner
17 Light
18 Water heater
19 Floor heater
20 Internet
21 Server
31 Controller
32 Communication interface
33 Display
34 Input interface
35 Memory
41 Basic operation application
42 Timer operation application

The invention claimed is:

1. A communication terminal for controlling, over a network, a device controlled by a signal communicated using a predetermined communication protocol, the communication terminal comprising:
a display;
a communication interface configured to communicate with the device over the network;
a memory storing a basic operation application and a timer operation application; and
operation application from the memory and to execute processing based on the basic operation application and the timer operation application,
wherein
the basic operation application causes the device to execute a basic function with the signal communicated using the communication protocol,
at a time designated by a timer setting, the timer operation application instructs the basic operation application to cause the device to execute the basic function with the signal communicated using the communication protocol, and
in a case of using wireless communication in a portion of the network, when the timer operation application determines that, at the time designated by the timer setting, the communication terminal is outside a service area or in an area with poor reception, the timer operation application waits until a communication state improves, and after the communication state improves, instructs the basic operation application to execute the basic function designated by the timer setting.

2. The communication terminal of claim 1, wherein the device is controlled via a power management apparatus connected between the communication terminal and the device.

3. The communication terminal of claim 1, wherein in a case of the device being an air-conditioner, the basic function includes at least one of turning power to the device ON/OFF, an airflow rate setting, an airflow direction setting, and a temperature setting.

4. The communication terminal of claim 1, further comprising an input interface configured to accept input of the timer setting from a user, wherein the timer operation application determines whether a condition of the timer setting that is input is appropriate, and when determining that the condition of the timer setting is not appropriate, displays an error indication on the display.

5. The communication terminal of claim 1, wherein while waiting until the communication state improves, the timer operation application displays, on the display, an indication that a standby state has been entered.

6. The communication terminal of claim 1, wherein when the timer operation application receives information indicating that a device that is to execute the basic function at the time designated by the timer setting is already executing the basic function designated by the timer setting at the time designated by the timer setting, the timer operation application displays the information on the display.

7. The communication terminal of claim 1, wherein when controlling a plurality of the devices over the network, the timer operation application displays a list of conditions of timer settings on the display, and upon selection of a time schedule corresponding to the devices listed, displays a condition confirmation screen for a timer setting of a selected device on the display.

8. The communication terminal of claim 1, wherein the timer operation application displays an energy-saving strategy on the display.

9. The communication terminal of claim 1, wherein in a case of the device being an air-conditioner, the timer operation application executes at least one of an operation mode change, a temperature setting change, an airflow rate setting change, and an airflow direction setting change for the air-conditioner when a predetermined condition is satisfied.

10. The communication terminal of claim 9, wherein a plurality of the predetermined conditions is set.

11. The communication terminal of claim 1, wherein when a predetermined condition is satisfied, the timer operation application instructs the basic operation application to cause another device, other than a device that is to execute the basic function at the time designated by the timer setting, to execute the basic function.

12. A non-transitory computer-readable recording medium configured to store a program for causing a communication terminal to control, over a network, a device controlled by a signal communicated using a predetermined communication protocol, the program comprising:
   instructing, at a time designated by a timer setting, a basic operation application included on the communication terminal to cause the device to execute a basic function with the signal communicated using the predetermined communication protocol,
   wherein
   the basic operation application causes the device to execute the basic function using the communication protocol, and
   in a case of using wireless communication in a portion of the network, when a timer operation application included on the communication terminal determines that, at the time designated by the timer setting, the communication terminal is outside a service area or in an area with poor reception, the timer operation application waits until a communication state improves, and after the communication state improves, instructs the basic operation application to execute the basic function designated by the timer setting.

13. A control system comprising:
   a power management apparatus configured to control a device with a signal communicated using a predetermined communication protocol; and
   a communication terminal configured to control the device via the power management apparatus,
   wherein
   the communication terminal comprises:
      a display;
      a communication interface configured to communicate with the power management apparatus;
      a memory storing a basic operation application and a timer operation application; and
      a controller configured to read the basic operation application and the timer operation application from the memory and to execute processing based on the basic operation application and the timer operation application,
   based on a timer setting indicated by the timer operation application, the basic operation application causes the device to execute a basic function at a time designated by the timer setting, and
   in a case of using wireless communication in a portion of the network, when the timer operation application determines that, at the time designated by the timer setting, the communication terminal is outside a service area or in an area with poor reception, the timer operation application waits until a communication state improves, and after the communication state improves, instructs the basic operation application to execute the basic function designated by the timer setting.

14. The control system of claim 13, wherein the power management apparatus also includes the basic operation application and the timer operation application, the timer operation application of the power management apparatus receives a timer setting indicated by the timer operation application of the communication terminal, and the timer operation application of the power management apparatus causes the device to execute the basic function with the basic operation application of the power management apparatus at a time designated by the timer setting indicated by the timer operation application of the communication terminal.

* * * * *